United States Patent [19]
Boysen

[11] Patent Number: 5,711,561
[45] Date of Patent: Jan. 27, 1998

[54] BUMPER MOUNTABLE CAMPER STAND

[76] Inventor: Richard L. Boysen, 7620 Keddleston Road, Vernon, British Columbia, Canada, V1B 3N7

[21] Appl. No.: 629,569

[22] Filed: Apr. 9, 1996

[51] Int. Cl.$^6$ ............................................. B60R 19/48
[52] U.S. Cl. ........................ 293/116; 293/118; 293/119; 248/352; 248/354.5; 248/357
[58] Field of Search ................................. 293/116, 117, 293/118, 119; 248/188.5, 188.7, 352, 354.5, 357

[56] References Cited

U.S. PATENT DOCUMENTS

| | | | |
|---|---|---|---|
| 3,608,943 | 9/1971 | Gostemski | 293/119 |
| 3,695,666 | 10/1972 | Corson | 293/117 X |
| 3,785,541 | 1/1974 | Sibley | 293/116 X |
| 3,820,833 | 6/1974 | Margetts et al. | 293/116 |
| 5,141,197 | 8/1992 | Mackaay | 248/439 |
| 5,219,105 | 6/1993 | Kravitz | 224/511 |
| 5,445,352 | 8/1995 | Long | 248/354.5 |
| 5,460,304 | 10/1995 | Porter et al. | 224/521 |
| 5,476,202 | 12/1995 | Lipp | 224/532 |

*Primary Examiner*—Andrew C. Pike
*Attorney, Agent, or Firm*—Anthony C. Edwards

[57] ABSTRACT

The bumper mountable camper stand includes a pair of base members each having first and second feet extending longitudinally opposite, and having a pillar extending perpendicularly therefrom, a lateral cross member and having a pair of tubes extending perpendicularly therefrom, first mounting apparatus for releasable mounting the first feet in sliding engagement to a mounting member on a frame of a vehicle, second mounting apparatus for releasable mounting the tubes in sliding engagement to the second feet, and third mounting apparatus for releasable mounting the tubes in sliding engagement to the pillars. The stand has a first configuration for mounting the cross member as a bumper of the vehicle when the tubes are released from the pillars, the first apparatus releasably mounting the first feet to the mounting member so that the base members are horizontal wherein the pillars are in horizontal opposed facing relation, and the second apparatus releasably mounting the tubes to the second feet so that the cross member is horizontal to be the bumper. The stand has a second configuration forming a support for resting placement of a camper thereon when the first feet are released from the mounting member and the tubes are released from the second feet, the base members being rotated 90 degrees so as to rotate the pillars to vertical, and the cross member being rotated 90 degrees so as to rotate the tubes downwardly to vertical for the third apparatus to releasably mount the tubes to the pillars.

3 Claims, 4 Drawing Sheets

BUMPER MOUNTABLE CAMPER STAND

FIELD OF THE INVENTION

The present invention relates to stands for recreational units such as campers that may be used to support a camper in the absence of a pickup truck so that the camper may be used in a safely stabilized condition, where the camper stand is transported externally of the camper, in this case, releasably mounted to the pickup track frame in the form of a bumper which may be converted into a stand.

BACKGROUND OF THE INVENTION

The present invention addresses a problem frequently encountered by recreationalists who use conventional "camper" units mounted into the cargo beds of pickup tracks. The problem frequently faced is that it is desirable to remove the camper from the pickup truck once situated at a suitable camping site so that the pickup track may be used for transportation, leaving the camper for use by persons remaining at the camp site. Conventional camper jacks do not provide sufficient stability to safely support a camper so as to allow people to enter the camper in the absence of either the camper being stabilized by the pickup truck or the camper being stabilized by auxiliary jacks or stands. Thus, typically, camper stands are transported within the interior of the camper unit during travel to and from the camp site. This is inconvenient for those travelling within the camper unit. Not only are conventional camper stands bulky, but they will often cause damage within the camper if untethered and are typically also quite dirty when loaded into the camper after use.

SUMMARY OF THE INVENTION

In summary, the bumper mountable camper stand of the present invention includes a pair of base members, each of the base members having first and second feet members extending longitudinally in opposite relation from each other along a longitudinal axis, and having a pillar member extending perpendicularly from the feet members thereof, a cross member extending along a lateral axis and having a pair of tube members extending perpendicularly therefrom, first means for releasable mounting of the first feet members of each of the pair of the base members in sliding engagement to a mounting member rigidly mounted to, or as part of, a frame of a vehicle, second means for releasable mounting of the tube members in sliding engagement to the second feet members of each of the pair of the base members, and third means for releasable mounting of the tube members in sliding engagement to the pillar members of each of the pair of the base members. The bumper mountable camper stand has a first configuration for mounting the cross member as a bumper of the vehicle when the tube members are released from the pillar members, wherein the first releasable mounting means releasably mounts the first feet members to the mounting member so that the base members are in horizontal attitudes wherein the pillar members are in horizontal opposed facing relation, and wherein the second releasable mounting means releasably mounts the tube members to the second feet members so that the cross member is in a horizontal attitude to be the vehicle bumper. The bumper mountable camper stand has a second configuration forming a support for resting placement of a camper thereon when the first feet members are released from the mounting member and the tube members are released from the second feet members, wherein the pair of base members are each rotated 90 degrees from the horizontal attitudes thereof about the longitudinal axes so as to rotate the pillar members to vertical attitudes, and wherein the cross member is rotated 90 degrees from the horizontal attitude thereof about the lateral axis so as to rotate the tube members downwardly into a generally vertical orientation for the third releasable mounting means to releasably mount the tube members to the pillar members.

DETAILED DESCRIPTION OF THE PREFERRED EMBODIMENT

Figure 1:
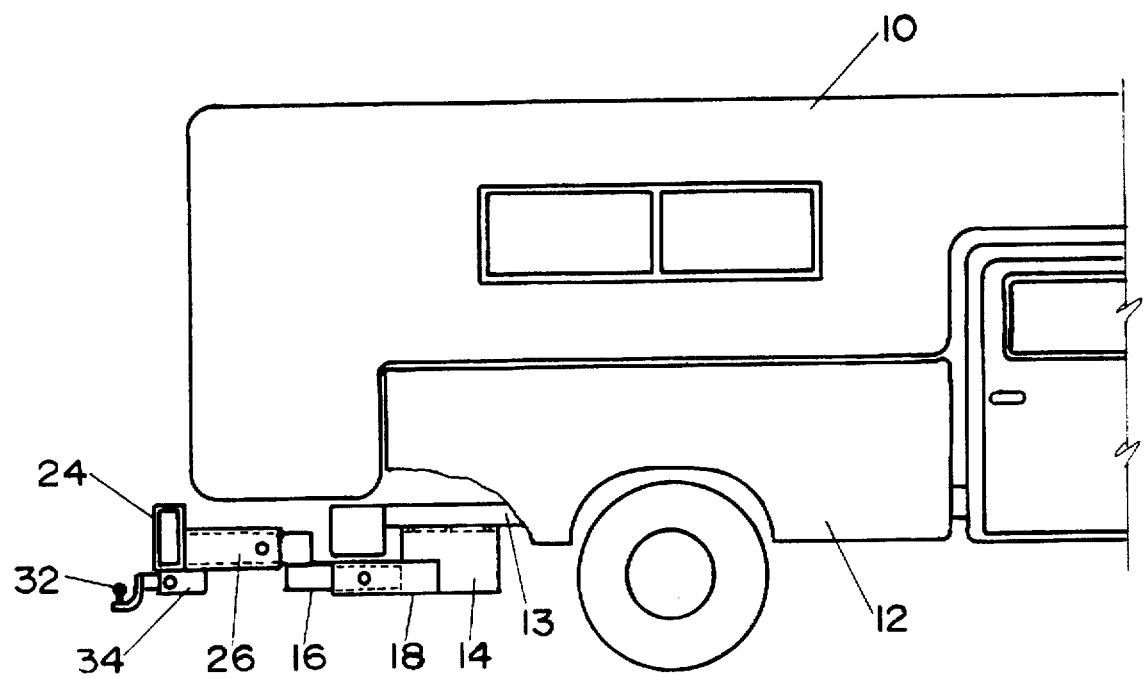
FIG. 1 is, in side elevation view, the camper stand of the present invention in its transport configuration mounted to a truck frame.

Thus, as may be seen in FIG. 1, camper 10 is conventionally mounted onto pickup truck 12 so as to be releasably secured in the conventional manner within the cargo box. Pickup truck 12 has longitudinal frame members 13, to which may be mounted mounting bracket 14 mountable as by bolting to conventional pickup truck flames. As better seen in FIGS. 2 and 3, base members 16 each have opposite feet members 16a and 16b. Feet members 16b are releasably mountable to mounting bracket 14 by means of collars 18 which are mounted to longitudinal frame members 13 by mounting bracket 14. Feet members 16b may be releasably secured within collars 18 by pins 20 releasably journalled in mating holes 22. Preferably feet members 16b are a snug fit within collars 18.

Supporting cross member 24 is releasable mountable onto feet members 16a by means of tubes 26. Tubes 26 are rigidly mounted, as by welding, to supporting cross member 24 so as to extend perpendicularly from supporting cross member 24. Tubes 26 are positioned for sliding mating engagement with feet members 16a when feet members 16b are slidably engaged within collars 18. Tubes 26 are releasably mountable onto feet members 16a by means of pins 28 releasably journalled in mating holes 30a and 30b. Thus in the fashion illustrated in FIGS. 2 and 3, the components of the bumper mountable camper stand of the present invention may be releasably mounted to the frame of a pickup track. In one embodiment, as shown in FIG. 1, supporting cross member 24 extends rearwardly of camper 10 so as to provide a truck bumper to which may be mounted trailer hitch 32 of a conventional type within hitch mount 34.

Figure 5:
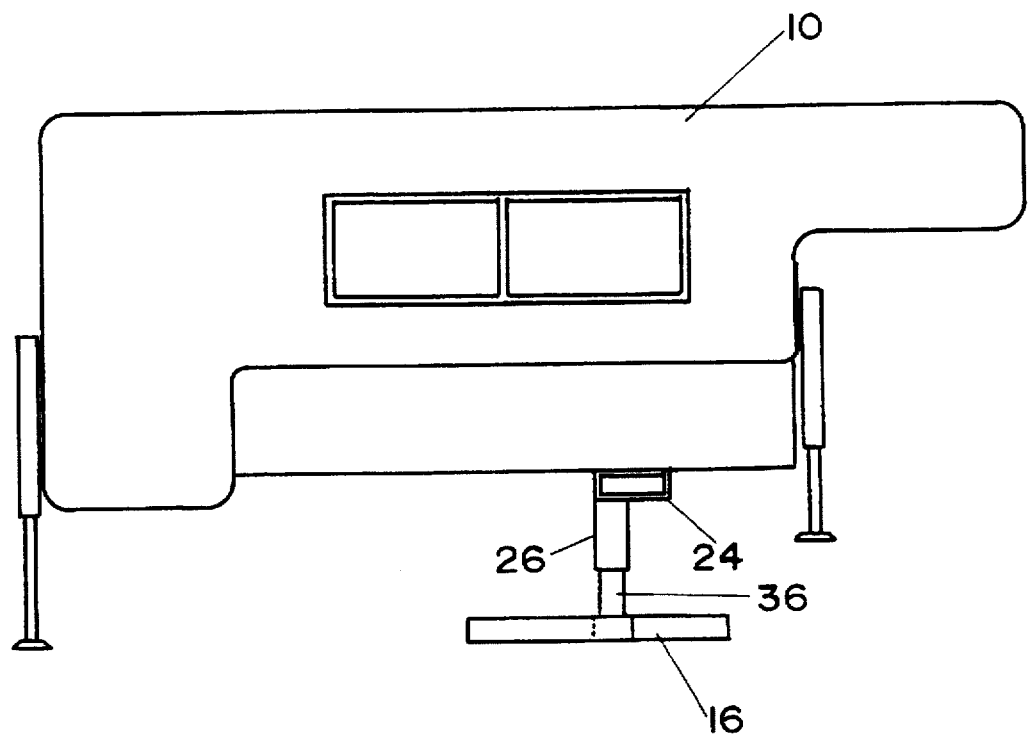
FIG. 5 is, in side elevation view, the camper stand of the present invention in its camper supporting configuration shown supporting a camper.
Figure 3:
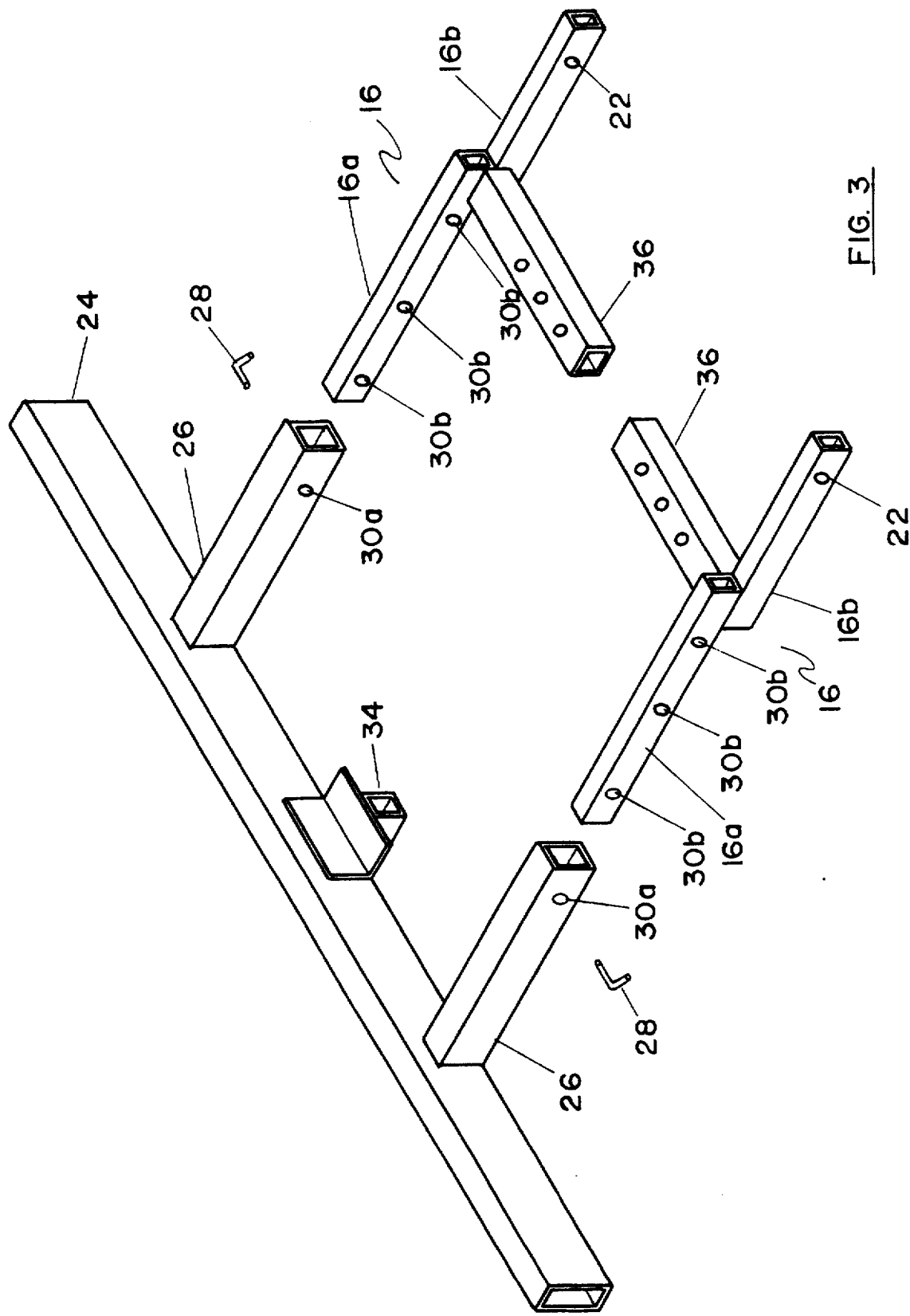
FIG. 3 is, in exploded perspective view, the camper stand of the present invention in its transport configuration.
Figure 4:
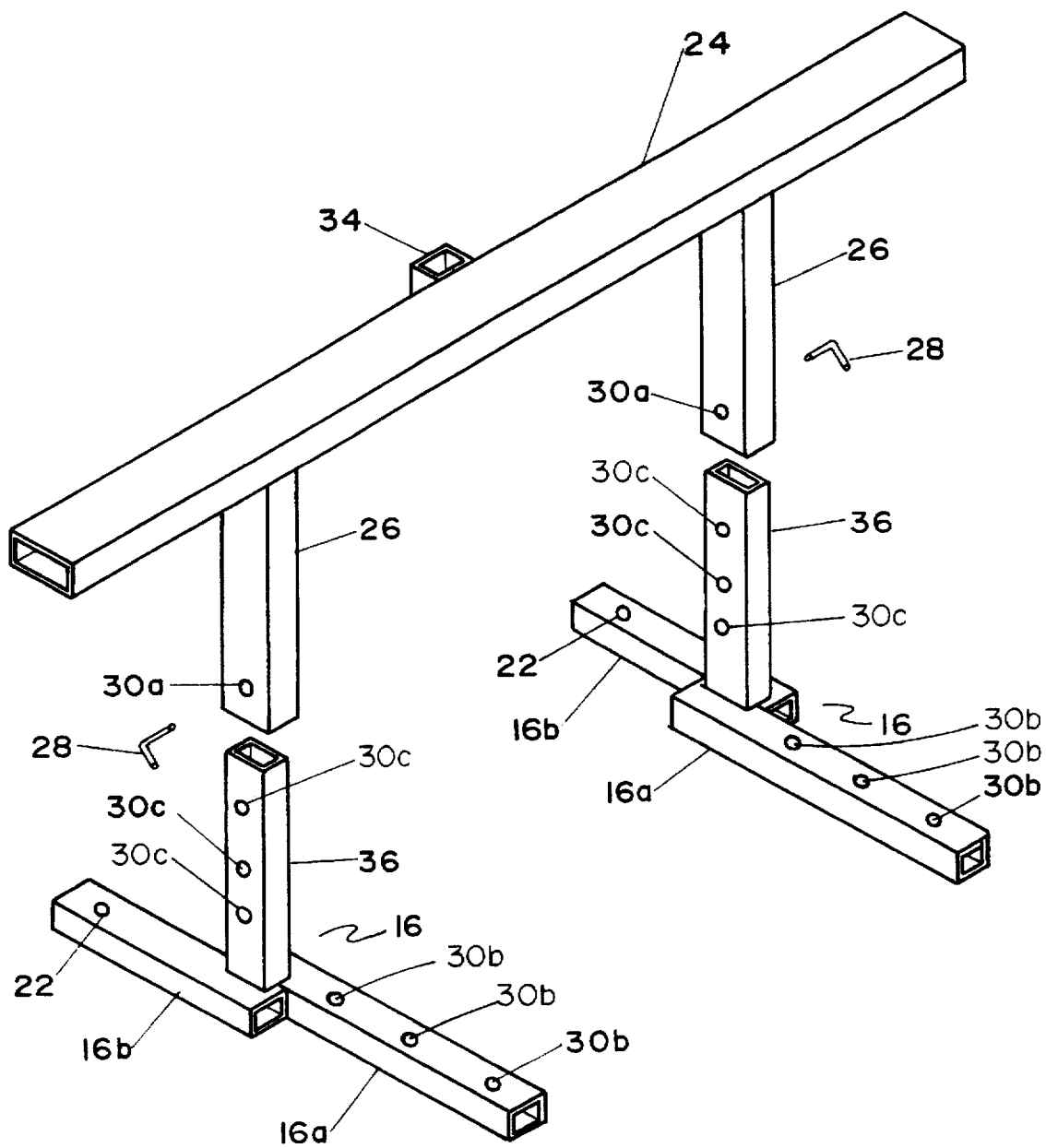
FIG. 4 is, in exploded perspective view, the camper stand of the present invention in its camper supporting configuration.

Base members 16 each include a pillar 36. Pillars 36 are perpendicular to feet members 16a and 16b and rigidly mounted thereto, as by welding. As illustrated in FIGS. 4 and 5, base members 16 and supporting cross member 24 may be removed from the configuration for transport illustrated in FIGS. 1–3 and reassembled so as to place base members 16 into contact with the ground. Supporting cross member 24 and tubes 26 are removed from sliding engagement with feet members 16a. Feet members 16b are removed from sliding engagement with collars 18. Base members 16 are rotated 90 degrees so as to rotate pillars 36 to the vertical, and feet members 16a and 16b placed on the ground. Supporting cross member 24 is also rotated 90 degrees so as to place tubes 26 in a downward vertical orientation corresponding to pillars 36. Tubes 26 may then be slid over pillars 36. Pins 28 may be journalled in mating holes 30a and 30c to releasably secure tubes 26 onto pillars 36. Camper 10 may be rested on supporting cross member 24 when the camper stand of the present invention is in its camper supporting configuration seen in operation in FIG. 5.

Tubes 26 may be telescopically secured on pillars 36 so as to correct for uneven ground, that is, so as to keep cross member 24 level by selective adjustment of pins 28 into different (as opposed to corresponding) mating holes 30c.

Tubes 26 are telescopically releasably securable onto the feet members 16a so as to selectively extend cross member 24 to the bottom-rearmost edge of camper 10 so as to adjust for different sized campers.

As with the sliding fitment of base members 16 within collars 18, all sliding fitted elements are preferably of a snug sliding fitment, and in particular pillars 36 within tubes 26, so as to provide laterally stable support for camper 10 when resting on supporting cross member 24.

Figure 2:
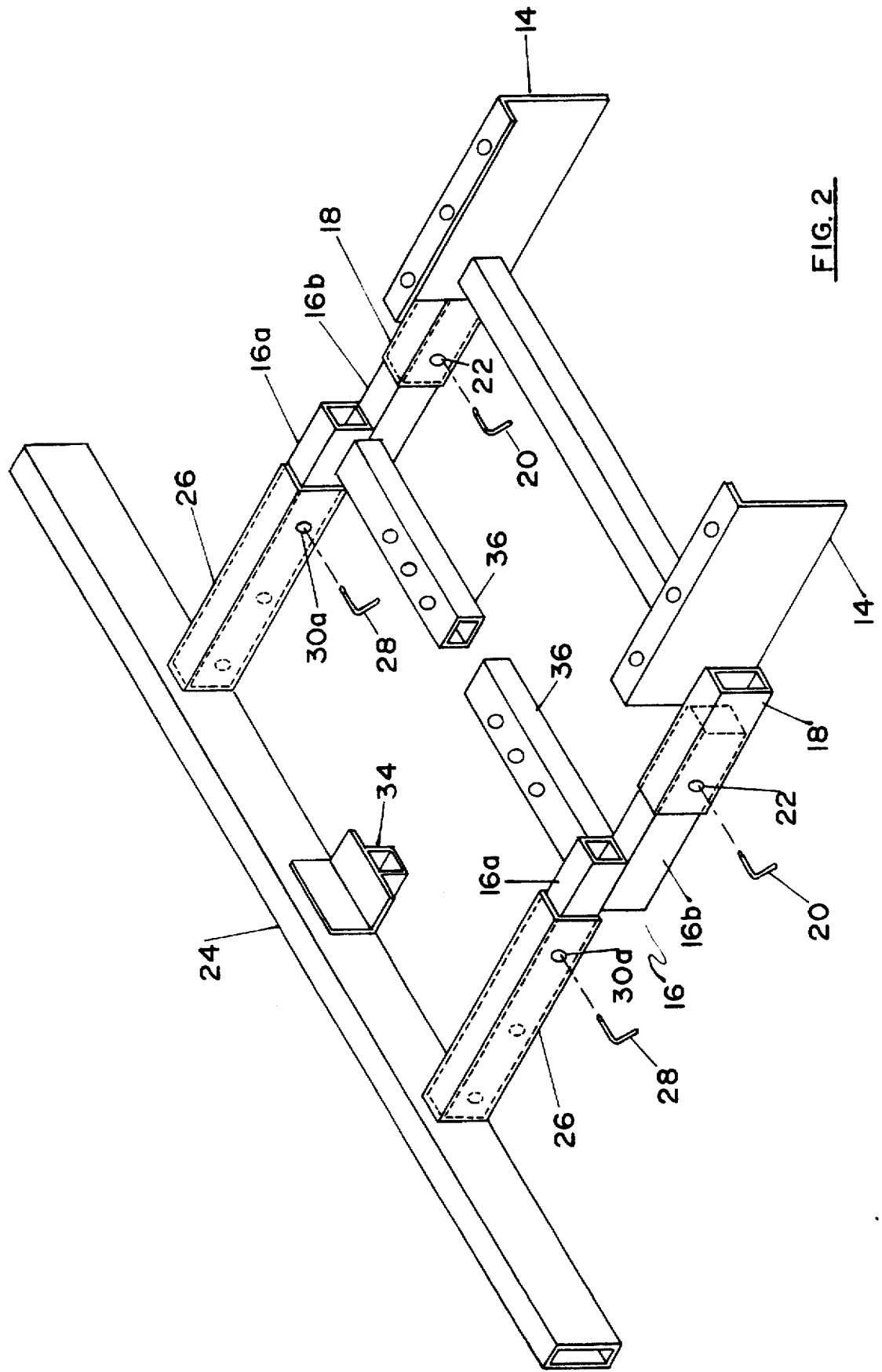
FIG. 2 is, in perspective view, the camper stand of the present invention in its transport configuration as illustrated in FIG. 1.

Advantageously, the opposite feet members 16a and 16b, are offset, for example, welded together so as to overlap as seen in FIG. 2, so that when in the transport configuration of FIG. 1, cross member 24 is elevated closer to the bottom-rearmost edge of camper 12 to simulate a truck bumper at correct towing trailer hitch height above the ground.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A bumper mountable camper stand comprising:

a pair of base members, each of said base members having first and second feet members extending longitudinally in opposite relation from each other along a longitudinal axis, and having a pillar member extending perpendicularly from said feet members thereof;

a cross member extending along a lateral axis and having a pair of tube members extending perpendicularly therefrom;

first means for releasably mounting said first feet members of each of said pair of said base members in sliding engagement to a mounting member rigidly mounted to, or as part of, a frame of a vehicle;

second means for releasable mounting said tube members in sliding engagement to said second feet members of each of said pair of said base members; and third means for releasable mounting said tube members in sliding engagement to said pillar members of each of said pair of said base members;

wherein said bumper mountable camper stand has a first configuration for mounting said cross member as a bumper of the vehicle when said tube members are released from said pillar members, wherein said first releasable mounting means releasably mounts said first feet members to said mounting member so that said base members are in horizontal attitudes wherein said pillar members are in horizontal opposed facing relation, and wherein said second releasable mounting means releasably mounts said tube members to said second feet members so that said cross member is in a horizontal attitude to be said vehicle bumper;

and wherein said bumper mountable camper stand has a second configuration forming a support for resting placement of a camper thereon when said first feet members are released from said mounting member and said tube members are released from said second feet members, wherein said pair of base members are each rotated 90 degrees from said horizontal attitudes thereof about said longitudinal axes so as to rotate said pillar members to vertical attitudes, and wherein said cross member is rotated 90 degrees from said horizontal attitude thereof about said lateral axis so as to rotate said tube members downwardly into a generally vertical orientation for said third releasable mounting means to releasably mount said tube members to said pillar members.

2. The bumper mountable camper stand of claim 1 wherein said first and second feet members on each of said base members are vertically offset when oriented in said first configuration whereby said cross member is elevatable closer to a bottom-rearmost edge of a camper mounted onto said vehicle so as to simulate a truck bumper at correct towing trailer hitch height.

3. The bumper mountable camper stand of claim 1 wherein said tube members are telescopically releasably securable onto said second feet members so as to selectively extend said cross member to a bottom-rearmost edge of said camper so as to adjust for different sized campers mounted on said vehicle.

* * * * *

UNITED STATES PATENT AND TRADEMARK OFFICE
CERTIFICATE OF CORRECTION

PATENT NO. : 5,711,561
DATED : January 27, 1998
INVENTOR(S) : Richard L. Boysen

It is certified that error appears in the above-identified patent and that said Letters Patent is hereby corrected as shown below:

Column 1, Line 9,
delete "track" and
insert --truck--.

Column 1, Line 17,
delete "tracks" and
insert --trucks--.

Column 1, Line 19,
delete "track" and
insert --truck--.

Column 2, Line 34,
delete "flames" and
insert --frames--.

UNITED STATES PATENT AND TRADEMARK OFFICE
CERTIFICATE OF CORRECTION

PATENT NO. : 5,711,561
DATED : January 27, 1998
INVENTOR(S) : Richard L. Boysen

It is certified that error appears in the above-identified patent and that said Letters Patent is hereby corrected as shown below:

Column 2, Line 54
delete "track" and
insert --truck--.

Column 4, Line 42
delete "a" ($2^{nd}$ occurence) and
insert --the--.

Signed and Sealed this

Fifteenth Day of June, 1999

Attest:

Q. TODD DICKINSON

Attesting Officer

Acting Commissioner of Patents and Trademarks